United States Patent
El-Nakhily et al.

(10) Patent No.: US 8,539,378 B2
(45) Date of Patent: Sep. 17, 2013

(54) METHOD, COMPUTER PROGRAM AND DATA PROCESSING SYSTEM FOR NAVIGATING IN A FLOW DIAGRAM

(75) Inventors: Ahmed El-Nakhily, Cairo (EG); Ehab Elkersh, Alexandria (EG)

(73) Assignee: International Business Machines Corporation, Armonk, NY (US)

( * ) Notice: Subject to any disclaimer, the term of this patent is extended or adjusted under 35 U.S.C. 154(b) by 1132 days.

(21) Appl. No.: 12/178,804

(22) Filed: Jul. 24, 2008

(65) Prior Publication Data

US 2009/0031256 A1   Jan. 29, 2009

(30) Foreign Application Priority Data

Jul. 26, 2007 (EP) .................................. 07113190

(51) Int. Cl.
*G06F 3/048* (2013.01)

(52) U.S. Cl.
USPC ........... 715/854; 715/763; 715/765; 715/835; 715/853; 715/967

(58) Field of Classification Search
USPC ................ 715/763, 764, 765, 835, 853, 854, 715/967, 733, 738, 838
See application file for complete search history.

(56) References Cited

U.S. PATENT DOCUMENTS

| | | | |
|---|---|---|---|
| 5,812,134 A * | 9/1998 | Pooser et al. ................. | 715/848 |
| 5,815,152 A * | 9/1998 | Collier et al. ................. | 715/839 |
| 6,243,091 B1 * | 6/2001 | Berstis ........................... | 715/839 |
| 7,225,407 B2 * | 5/2007 | Sommerer et al. ............ | 715/738 |
| 7,373,614 B1 * | 5/2008 | Holmes .......................... | 715/855 |
| 7,426,703 B2 * | 9/2008 | Cheung et al. ................ | 715/854 |
| 7,975,235 B2 * | 7/2011 | Feng et al. ..................... | 715/764 |
| 2002/0130907 A1 * | 9/2002 | Chi et al. ....................... | 345/853 |
| 2004/0017404 A1 * | 1/2004 | Schileru-Key ................ | 345/854 |
| 2004/0034541 A1 * | 2/2004 | Caban ............................. | 705/1 |
| 2004/0169679 A1 * | 9/2004 | Parikh et al. .................. | 345/738 |
| 2004/0189718 A1 * | 9/2004 | Stein et al. .................... | 345/853 |
| 2005/0071785 A1 * | 3/2005 | Chadzelek et al. ........... | 715/854 |
| 2006/0101341 A1 * | 5/2006 | Kelly et al. .................... | 715/738 |
| 2008/0163127 A1 * | 7/2008 | Newell et al. ................. | 715/854 |
| 2009/0132968 A1 * | 5/2009 | Nan et al. ....................... | 715/854 |
| 2009/0172603 A1 * | 7/2009 | Young Suk Lee ............ | 715/854 |

* cited by examiner

*Primary Examiner* — Xiomar L Bautista
(74) *Attorney, Agent, or Firm* — Patents on Demand P.A.; Brian K. Buchheit; Scott M. Garrett (57) ABSTRACT

A method of navigating in a flow diagram is disclosed. The flow diagram is displayed in a graphical user interface (GUI) and the flow diagram comprises a set of task elements and a set of connectors. A set of navigation commands is provided. The set of navigation commands comprises a first navigation command and a second navigation command. A selector is moved from a first task element of the set of task elements to a first connector of the set of connectors in response to the reception of the first navigation command, wherein the first connector immediately succeeds the first task element in the flow diagram. Furthermore, the selector is moved from the first connector to the first task element in response to the reception of the second navigation command.

19 Claims, 7 Drawing Sheets

METHOD, COMPUTER PROGRAM AND DATA PROCESSING SYSTEM FOR NAVIGATING IN A FLOW DIAGRAM

CROSS-REFERENCE TO RELATED APPLICATIONS

This application claims the benefit of European Patent Application No. 07113190.8, filed 26 Jul. 2007 and which is hereby incorporated by reference.

BACKGROUND OF THE INVENTION

The invention relates to a method and data processing system for navigating in a flow diagram.

A flow diagram is a schematic representation of an algorithm or of a process in a very generic sense. For a flow diagram, the term flow chart is also frequently employed.

A flow diagram typically includes a set of task elements and a set of connectors that link task elements of the set of task elements with each other thereby defining a flow in the flow diagram. The task elements are typically represented by boxes and the connectors are typically represented by arrows indicating the direction of the flow.

Figure 1:
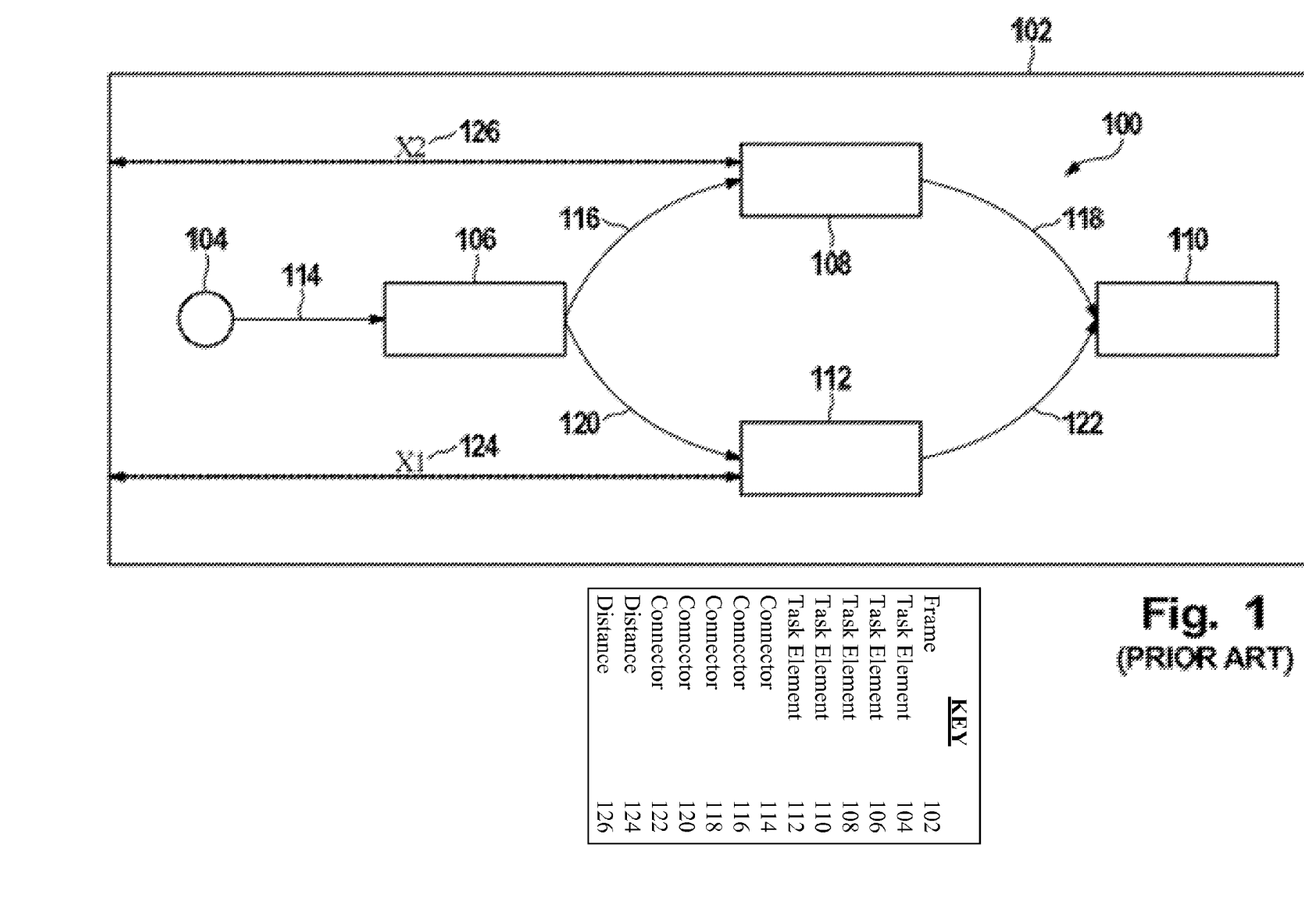
FIG. 1 shows schematically an example of a flow diagram.

An example of a flow diagram 100 is shown in FIG. 1 (Prior Art). The flow diagram 100, for example, can be visualized on a graphical user interface (e.g., a graph editor) of a computer system. The graphical user interface can include a frame 102 which surrounds the graphical user interface. The flow diagram 100 includes task elements 104, 106, 108, 110, and 112. Each task element describes a specific step or task in the flow diagram 100. The flow diagram 100 further includes connectors 114, 116, 118, 120, and 122. The task element 104 represents the start element of the flow diagram 100 and is connected with the task element 106 via the connector 114. The task element 106 is connected by the connector 116 with the task element 108 which is connected by the connector 118 with the task element 110 which represents the end of the flow diagram 100. Furthermore, the task element 106 is connected with the task element 112 via the connector 120. The task element 112 is also connected by the connector 122 with the task element 110.

The graph editor may offer the possibility to move selection marks from a task element to another task element by use of navigation commands. For example, selection marks might be placed to the task element 104. In response to the reception of a predefined navigation commands (e.g., the user of the system types one times on the "TAB"-key of the keyboard of the computer system), the graph editor moves the selection marks from task element 104 to task element 106.

The connectors 116 and 120 relate to a bifurcation in the flow diagram 100 as the flow goes via connector 116 to task element 108 and in parallel via connector 120 to task element 112. In that sense, a bifurcation in a flow diagram defines the starting point of two or more branches of a flow diagram. In the example shown here, the flow diagram 100 has two branches, wherein a first branch is given by connector 116, by task element 108, and by connector 118, and wherein a second branch is defined by connector 120, task element 112, and connector 122.

In response to the reception of the navigation command (e.g., a hot on the "TAB" key), the selection marks are moved according to a known prior art system from the task element 106 to the selection mark as the distance 124 of the task element 112 with respect to the left side of the frame 102 is shorter than the distance 126 of the task element 108. Then, in response to the reception of the navigation command, the selecting marks are further moved from task element 112 to the task element 108 since this task element is the next nearest task element with respect to the left side of the frame 102.

The semantics of the flow diagram 100 is however given by the flow flowing from task element 106 to task element 110 over the first branch and in parallel over the second branch.

As can be seen by the move of the selection marks from task element 112 to task element 108, the semantics of the flow diagram 100 is not at all reflected by this move.

The known prior art system is therefore disadvantageous as it does not enable a user to navigate through a flow diagram so that the semantics of the flow diagram is reflected by the moves through the flow diagram.

SUMMARY OF THE INVENTION

The present invention is directed to a method and data processing system as defined in the independent claims. Further embodiments of the invention are described in the dependent claims.

According to a first aspect of the invention, a method of navigating is provided in a flow diagram. In accordance with an embodiment of the invention, the flow diagram is displayed in a graphical user interface (GUI) and the flow diagram includes a set of task elements and a set of connectors. The method in accordance with the invention comprises providing a set of navigation commands. The set of navigation commands includes a first navigation command and a second navigation command. According to a step of the method in accordance with the invention, a selector is moved from a first task element of the set of task elements to a first connector of the set of connectors in response to the reception of the first navigation command. The first connector is the connector of the set of connectors that immediately succeeds the first task element in the flow diagram. Furthermore, according to a step of the method in accordance with the invention, the selector is moved from the first connector to the first task element in response to the reception of the second navigation command.

The selector can be regarded as selection marks mentioned in the background section. The selector indicates to a user of the graphical user interface which task element or which connector is currently selected. The method in accordance with the invention is particularly advantageous as the selector cannot only be moved between task elements but between task elements and the connectors. The user of the graphical user interface is therefore enabled to edit the connectors (e.g., by moving the end point of a connector from one task element to another task element) thereby changing the semantics of the flow diagram. The first navigation command might relate to the rightward pointing arrow key "→" and the second navigation command might relate to the leftward pointing arrow key "←" on a standard computer keyboard.

In accordance with an embodiment of the invention, the first connector links the first task element with a second task element of the set of task elements. According to a further step of the method in accordance with the invention, the selector is moved from the first connector to the second task element in response to the reception of the first navigation command. Thus, the first navigation command can be used to navigate through the task elements and connectors in a way that the semantics of the flow diagram is reflected.

In accordance with an embodiment of the invention, the selector is moved from the second task element to the first connector in response to the reception of the second navigation command. Once the selector is placed at the second task element, the selector can be moved to the first connector that connects the first task element with the second task element in a way that the flow flows from the first task element via the first connector to the second task element. The second navigation command is the complementary command with respect to the first navigation command.

In accordance with an embodiment of the invention, a second connector links the first task element with a third task element of the set of task elements. The set of navigation commands comprises a third navigation command and a fourth navigation command. According to a step of the method in accordance with the invention, the selector is moved from the first connector to the second connector in response to the reception of the third navigation command and from the second connector to the first connector in response to the reception of the fourth navigation command.

The flow diagram comprises a bifurcation as the first task element is linked by the first connector with the second task element and in parallel by the second connector with the third task element. The third navigation command then allows for movement of the selector from the first connector to the second connector and the fourth navigation command, which is complementary to the third navigation command, allows moving the selector back from the second connector to the first connector. The method in accordance with the invention is advantageous as it enables the user to move between two or more branches of the flow diagram, wherein the two or more branches start at a common bifurcation. The third navigation command might relate to the upward pointing arrow key "↑" and the second navigation command might, relate to the downward pointing arrow key "↓" on a standard computer keyboard.

In accordance with an embodiment of the invention, a third connector of the set of connectors links the second task element with a fourth task element of the set of task elements. A fourth connector of the set of connectors links the third task element to the fourth task element. According to a step of the method in accordance with the invention, the selector is moved in the graphical user interface from the fourth task element to the third connector in response to the reception of the second navigation command. Furthermore, the selector is moved from the third connector to the fourth connector in response to the reception of the third navigation command and from the fourth connector to the third connector in response to the reception of the fourth navigation command.

The third connector and the fourth connector join at the fourth task element as the end points of both connectors run into the fourth task element. The second navigation command allows moving the selector from the fourth task element to the third connector while the third and fourth navigation commands allow for movement of the selector between the third and fourth connector.

In accordance with an embodiment of the invention, the set of navigation commands comprises a fifth navigation command and a sixth navigation command. The first task element is linked with a fifth task element of the set of task elements via a first branch of the flow diagram and via a second branch of the flow diagram. The first and second branches run in parallel with respect to each other and comprise each at least a task element of the set of task elements. According to a step of the method in accordance with the invention, the selector is moved in the graphical user interface from the first task element to the fifth task element in response to the reception of the fifth navigation command and from the fifth task element to the first task element in response to the reception of the sixth navigation command. The fifth and sixth navigation commands are therefore particularly advantageous as they allow the user of the graphical user interface to skip the branches of a flow diagram and enable the user to move the selector from the task element where the bifurcation of the two branches occurs to the task element where the two branches join.

It is evident to the skilled person that the method in accordance with the invention is by no means limited to only two branches between the first task element and the fifth task element. In fact, a set of branches might connect the first and fifth task element, wherein the fifth and sixth navigation commands allow moving the selector from the first task element to the fifth task element.

The fifth navigation command might, relate to the tabulator key and the sixth navigation command might relate to the combination of the shift key and the tabulator key on a standard computer keyboard. The combination of the shift and tabulator key relates to the process of keeping the shift key pressed while the tabulator key is pressed on the keyboard.

In accordance with an embodiment of the invention, the set of navigation commands includes a seventh navigation command and an eighth navigation command. According to a step of the method, a navigation history is created by monitoring the navigation of a user through the flow diagram. According to a further step of the method in accordance with the invention, the selector is moved from a first flow element to a second flow element in response to the reception of the seventh command. The first flow element is the actual flow element that is selected by the selector and the second flow element is the flow element selected before the first flow element according to the navigation history. Furthermore, according to a step of the method in accordance with the invention, the selector is moved from the second flow element to the first flow element in response to the reception of the eighth command. The second flow element is then the actual flow element selected by the selector and the first flow element is the flow element that has been according to the navigation history selected immediately after the first flow element. The first flow element relates to a task element of the set of task elements or to a connector of the set of connectors. Similarly, the second flow element relates to a task element of the set of task elements or to a connector of the set of connectors.

The navigation history therefore allows in combination with the seventh and eighth navigation commands to move back and forth in the flow diagram according to the path recorded by the navigation history and according to which the user has moved through the flow diagram before.

The seventh navigation command might, relate to the combination of the ALT-key and the rightward pointing arrow key "→" pressed simultaneously on a keyboard. The eight navigation command might, relate to the combination of the ALT-key and the leftward pointing arrow key "←" pressed simultaneously on a keyboard.

In accordance with an embodiment of the invention, the navigation history is stored. The navigation history can be stored on a storage device of the computer system that performs the method in accordance with the invention and that is used to display the graphical user interface for the user who is navigating through the flow diagram.

In accordance with an embodiment of the invention, a task element of the set of task elements comprises a sub-flow diagram. The set of navigation commands comprises a ninth and a tenth navigation command. The ninth navigation command is employed to access the sub-flow diagram of the task element and the tenth navigation command is employed to exit the sub-flow diagram.

The ninth navigation command might relate to the combination of the ALT-key and the downward pointing arrow key "↓" pressed simultaneously on a keyboard. The tenth navigation command might relate to the combination of the ALT-key and the upward pointing arrow key "↑" pressed simultaneously on a keyboard.

In accordance with an embodiment of the invention, the navigation commands given above are used as described before with respect to the above-mentioned flow diagram to navigate in the sub-flow diagram. In particular, at least one of the following commands can be employed to navigate in the sub-flow diagram: the first navigation command, the second navigation command, the third navigation command, the fourth navigation command, the fifth navigation command, the sixth navigation command, the seventh navigation command.

In accordance with an embodiment of the invention, the set of navigation commands comprises an eleventh navigation command. The eleventh navigation command is used to access the flow diagram. In response to the reception of the eleventh navigation command, the selector becomes visible to the user of the graphical user interface and is put automatically to the initial task element of the flow diagram. The initial task element is the task element that is the task element with which the flow starts.

The eleventh navigation command could relate to a single or double click with a pointing device, e.g., a mouse, into the graphical user interface.

In accordance with an embodiment of the invention, a task element of the set of task elements is associated with a text. According to a step of the method in accordance with the invention, the text is read for a user of the graphical user interface in response to a move of the selector to the task element.

The text of a task element that is selected by the selector can be read to a user by a screen reader that is also executed by the computer system that executes the graphical user interface (e.g., a graph editor that depicts the flow diagram). Reading the text associated with a task element is in particular advantageous for a blind person that is navigating through the flow diagram. Moreover, the method in accordance with the invention allows for navigating through the flow diagram so that the semantics of the flow is reflected when moving from one task element via a connector to the succeeding or preceding task element Thus, a blind person navigating through the flow diagram and listening to the spoken text is able to grasp the semantics of the flow diagram and to understand the flow diagram.

A flow diagram might relate to a business process, a process describing how an algorithm of a computer program product works, or any other process (e.g., a description of a travel route or of a cooking recipe). The flow diagram might further be provided by a web service and made visible on a GUI of a computer system that downloaded the flow diagram from the web service. A screen reader might then be used to read each text provided with a task element to a blind person when the blind person navigates through the flow diagram. The blind person is able to understand the flow diagram as the method in accordance with the invention ensures that the blind person moves through the flow diagram so that the semantics of the flow diagram is reflected.

In accordance with an embodiment of the invention, the navigation commands of the set of navigation commands are provided by an input device connected to the computer system that hosts and executes the graphical user interface. The input device might be a keyboard and each navigation command of the set of navigation commands might be associated with a particular key of the keyboard or with a particular key combination.

According to a second aspect of the invention, there is provided a computer program product digitally encoded in a storage medium, such as a volatile or non-volatile memory. The computer program product includes computer executable instructions. The instructions are adapted, when executed on a computer, to cause the computer to perform steps of the method in accordance with the invention.

According to a third aspect of the invention, there is provided a data processing system for navigating in a flow diagram.

In accordance with an embodiment of the invention, the data processing system comprises a display for displaying the flow diagram in a graphical user interface and a screen reader for reading the text associated with a selected flow element of the flow diagram to a user of the computer system. For outputting the text in the form of speech, the data processing system furthermore comprises a loud speaker or a speaker system.

DETAILED DESCRIPTION OF THE INVENTION

Figure 2:
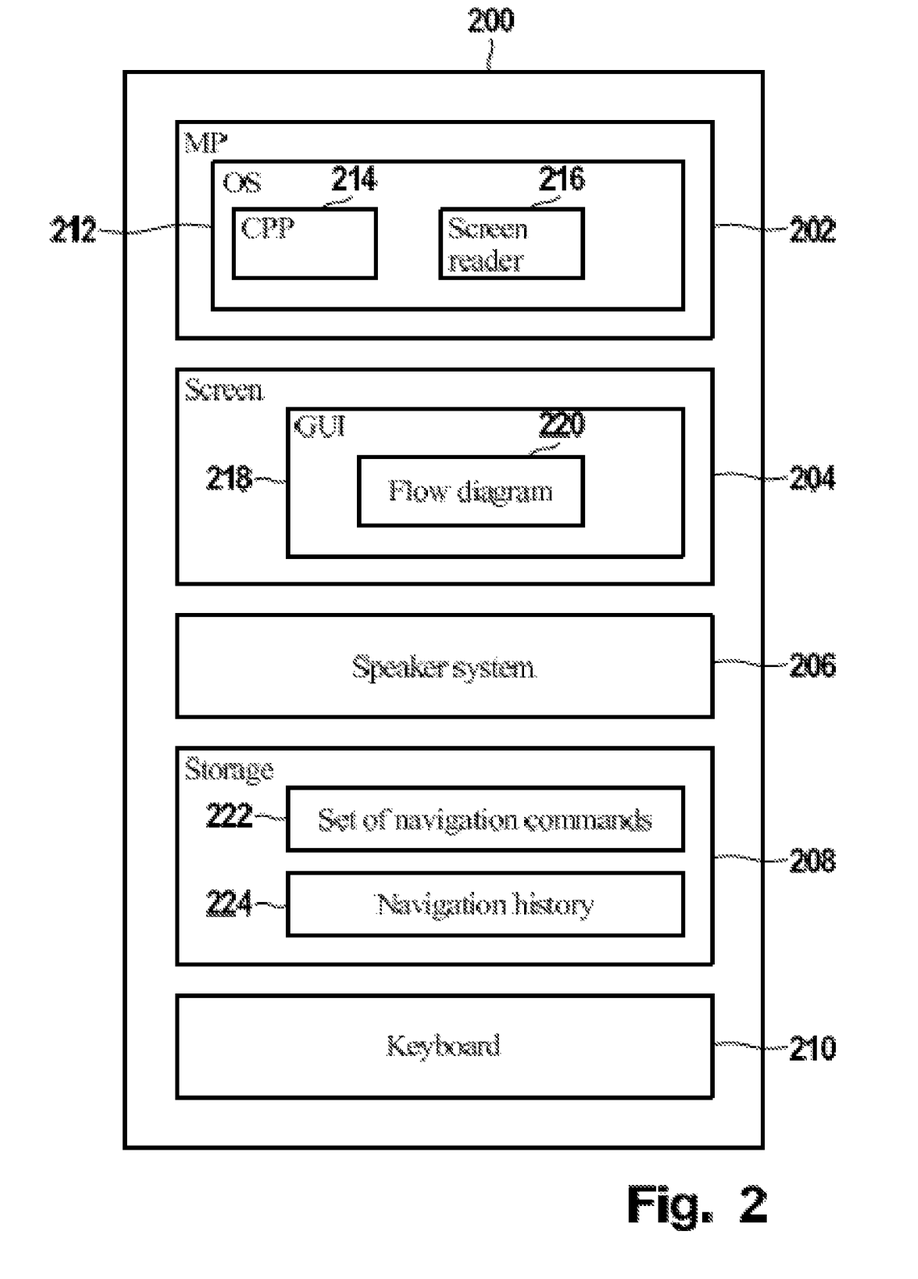
FIG. 2 shows a block diagram of a data processing system.

FIG. 2 shows a block diagram of a data processing system 200. The data processing system 200 includes a microprocessor 202, a screen 204, a speaker system 206, storage 208, and a keyboard 210. The microprocessor 202 executes an operating system 212. The operating system 212 is used to execute a computer program product 214 and a screen reader 216. The codes of the operating system 212, of the computer program product 214, and of the screen reader 216 are stored on the storage 208 and loaded for execution into the microprocessor 202.

The computer program product 214 can be regarded as a graph editor that provides a graphical user interface 218 which can be made visible on the screen 204 and that is employed to visualize a flow diagram 220. An example of a flow diagram 220 will be given with reference to the FIGS. 3-13.

The computer program product 214 further comprises a set of navigation commands 222 by which a user is enabled to navigate through the flow diagram 220. The set of navigation commands 222 can be defined by the user of the data processing system 200 or can be preset by the developer of the computer program product 214. The set of navigation commands 222 might be stored in a machine-processable form on the storage 208 as shown with reference to FIG. 2 so that the computer program product 214 can read out the set of navigation commands 222 and use them in order to enable a user to navigate through the flow diagram 220. The navigation through an exemplary flow diagram 220 will be elaborated with reference to the following drawings.

When the user is navigating through the flow diagram 220, the sequence of flow elements selected by the user might be stored in a so-called navigation history 224 on the storage 208. The set of navigation commands 222 include navigation commands that allow the user by use of these navigation commands to navigate back according to the navigation history 222. The keyboard 210 can be used to provide the navigation commands in order to navigate through the flow diagram 220.

The screen reader 216 can be regarded as a computer program that is in essence a text to speech system. The screen reader 216 can be used to read text in the flow diagram, in particular text associated with task elements of the flow diagram, to a user when navigating through the flow diagram 220. This can be advantageous for a blind person trying to understand the flow diagram 220.

Figure 3:
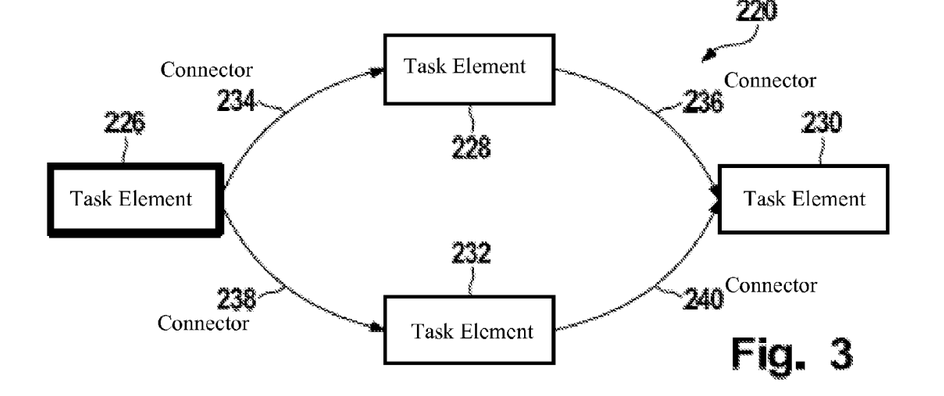
FIG. 3 shows schematically a flow diagram.

FIG. 3 shows an example for the flow diagram 220 that can be visualized in the graphical user interface 218 of FIG. 2. The flow diagram 220 includes task element 226, task element 228, task element 230, and task element 232. The flow diagram 220 also includes connector 234, connector 236, connector 238, and connector 240. The task element 226 is connected with the task element 228 by use of the connector 234. The task element 228 is connected with the task element 230 by use of connector 236. In parallel, the task element 226 is connected with the task element 232 by use of the connector 238. The task element 232 is connected with the task element 230 by use of connector 240.

The connectors 234-240 are represented by arrows that indicate the direction of the flow. Thus, according to the flow diagram 220, the flow starts at task element 226 and stops at task element 230, whereby the flow passes in parallel over task element 228 as well as over task element 232. A selector can be used to navigate through the flow diagram 220. The selector is represented according to this example by selection marks that visualize the selected task element or connector by thicker lines than normal. According to the example shown in FIG. 3, the selector is placed at task element 226 as the box representing the task element 226 is drawn with thicker lines than the boxes representing the other task elements.

The user who wants to move the selector from the task element 226 can press a first navigation command provided by the set of navigation commands 222 mentioned with respect to FIG. 2.

Figure 4:
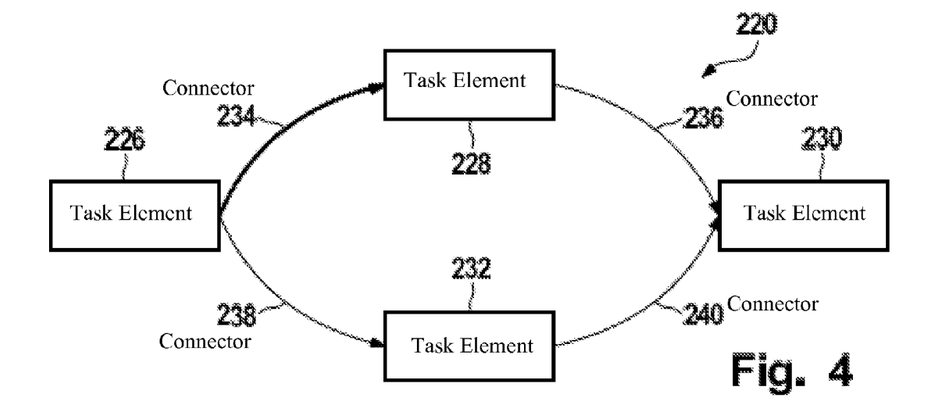
FIG. 4 shows schematically a flow diagram.

FIG. 4 shows the flow diagram 220, wherein in response to the reception of the first navigation command, the selector has been moved from the task element 226 to the connector 234 that immediately succeeds the task element 226. Thus, in response to the reception of the first navigation command, the selector has been moved to the connector 234 allowing the user to modify or edit the connector 234 by moving the starting point of the connector which is currently at task element 226 to another task element, such as task element 232.

Figure 5:
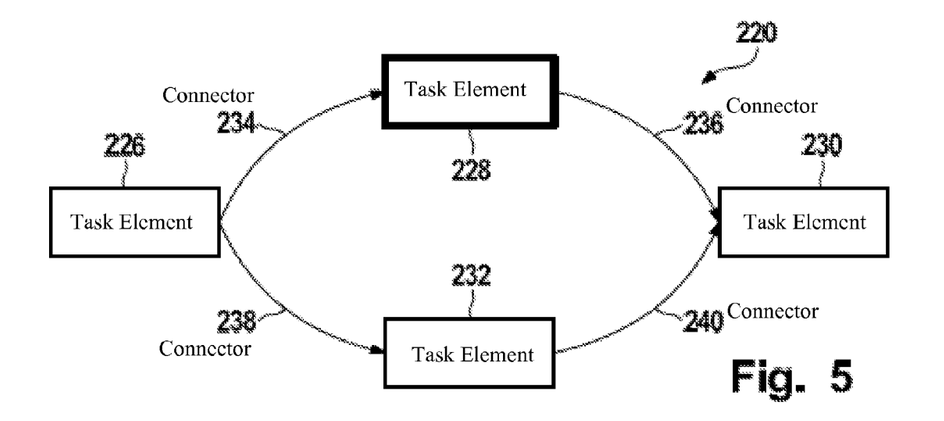
FIG. 5 shows schematically a flow diagram.

FIG. 5 shows the flow diagram 220, wherein, in response to the reception of a further first navigation command, the selector has been moved from connector 234 to task element 228.

It is obvious to the skilled person, that the selector can be further moved to connector 236 and then to the task element 230 by use of the first navigation command. The method in accordance with the invention can be advantageous as it provides a possibility to navigate through the flow diagram so that the semantics of the flow diagram is reflected by the individual moves through the flow diagram.

The set of navigation commands also provides a second navigation command which is the complementary command with respect to the first navigation command and allows navigating through the flow diagram in the reverse direction. Thus, with reference to FIG. 5, the selector can be moved by use of the second navigation command from the selected task element 228 to the connector 234.

Figure 6:
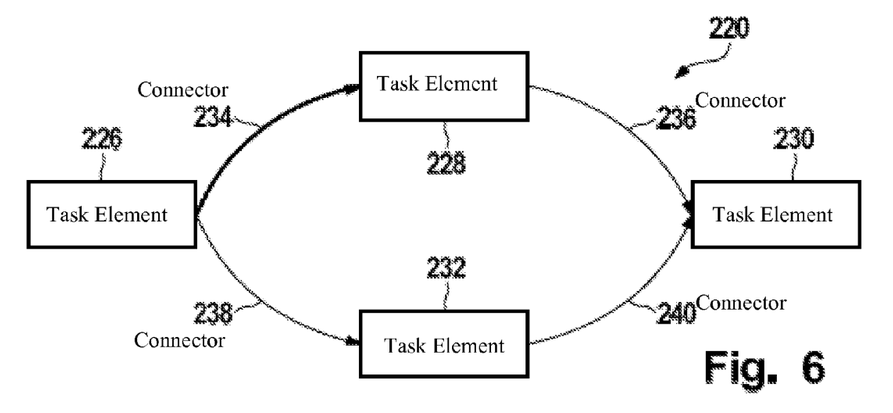
FIG. 6 shows schematically a flow diagram.
Figure 7:
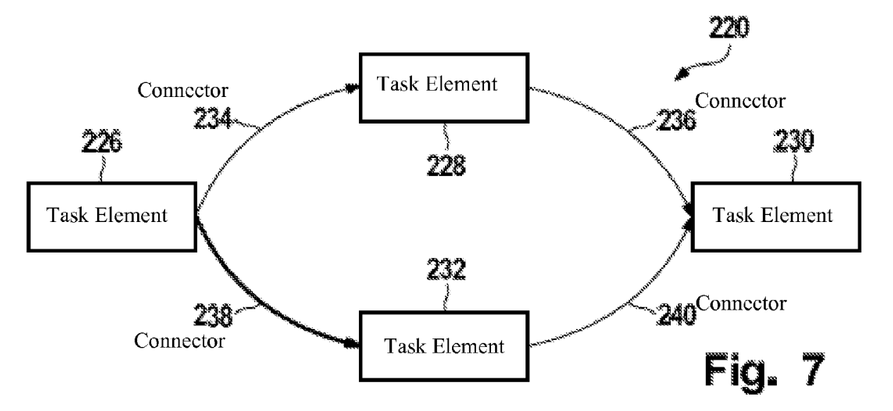
FIG. 7 shows schematically a flow diagram.

FIG. 6 shows the flow diagram 220, wherein the selector is moved to connector 234. The connector 234 connects task element 226 with task element 228. Furthermore, the connector 238 connects the task element 226 with task element 232 and thus runs in parallel to the connector 234. The connectors 234 and 238 therefore represent a bifurcation in the flow diagram 220. The set of navigation commands provides a third navigation command that enables the user to move the selector from the connector 234 to the connector 238 as shown in FIG. 7 which shows the flow diagram 220, after the selector has been moved to connector 238. In order to move the selector back from connector 238 to connector 234, the set of navigation commands provides a fourth navigation command. The method in accordance with the invention can be advantageous as it provides navigation commands by which the user is enabled to switch between bifurcations occurring in a flow diagram and therefore provides a very flexible way for the user to navigate through the flow diagram.

Figure 8:
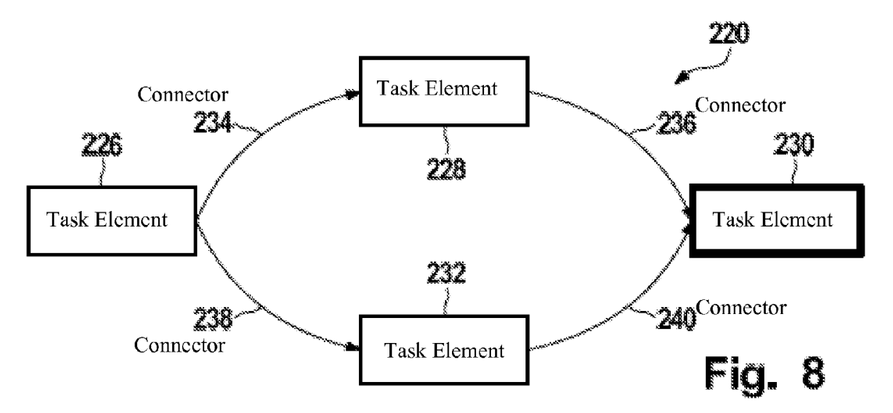
FIG. 8 shows schematically a flow diagram.
Figure 9:
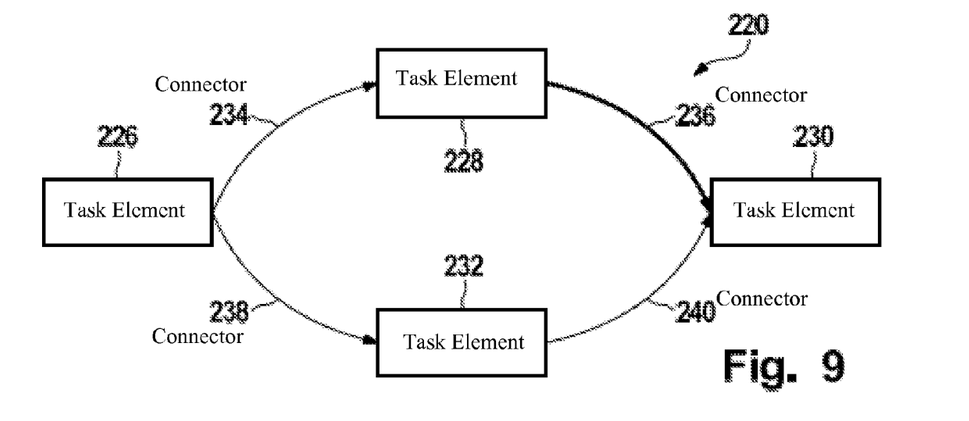
FIG. 9 shows schematically a flow diagram.
Figure 10:
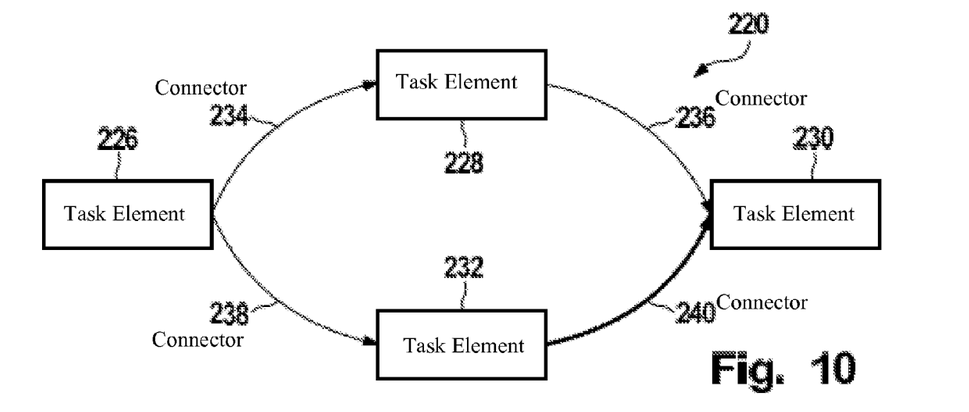
FIG. 10 shows schematically a flow diagram.

FIG. 8 shows the flow diagram 220, wherein the selector is placed to task element 230. In order to move the selector, the user could use the second navigation command which causes the selector to go to connector 236 as shown in FIG. 9. Furthermore, by use of the third navigation command, the selector can be moved from connector 236 to connector 240 as visualized with respect to FIG. 10. The connectors 234 and 240 both end at task element 230 and therefore represent a join in the flow diagram 220. The method in accordance with the invention can be advantageous as it provides navigation commands that allows a user to navigate between various joins in a flow diagram and therefore provides a very flexible way to switch between branches in the flow diagram, wherein the sequence represented by the connector 234, the task element 228 and the connector 236 can be regarded as first branch of the flow diagram 220, and wherein the sequence represented by the connector 238, the task element 232, and the connector 240 can be regarded as second branch of the flow diagram 220.

Figure 11:
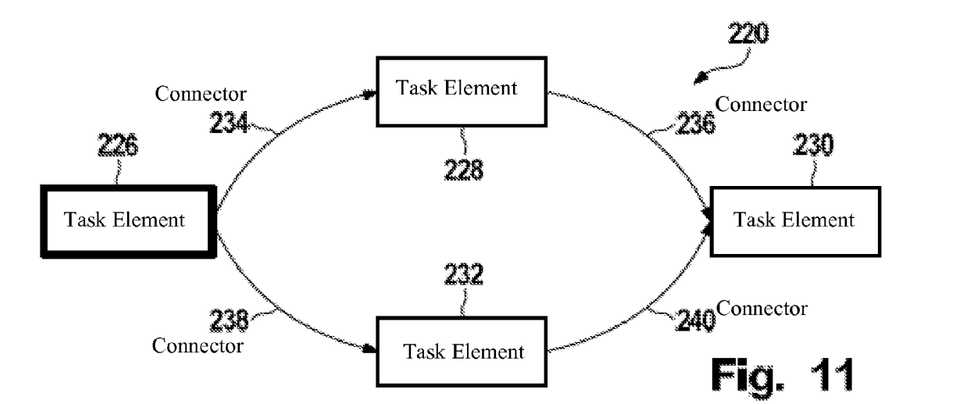
FIG. 11 shows schematically a flow diagram.
Figure 12:
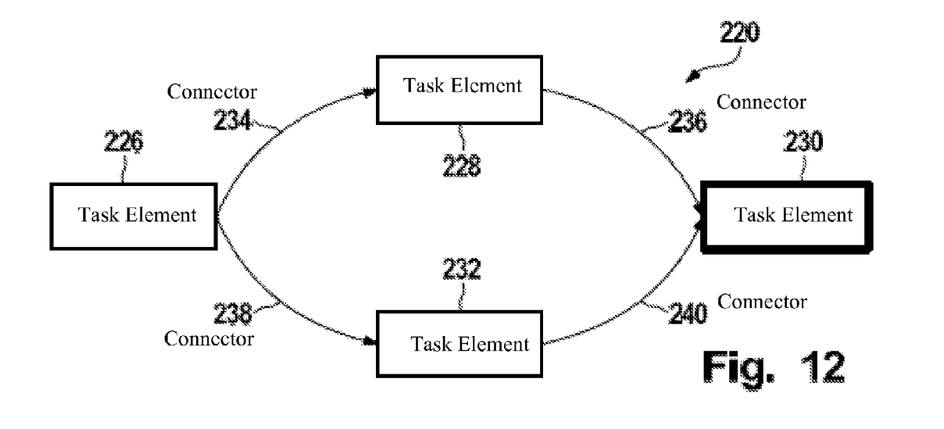
FIG. 12 shows schematically a flow diagram.

FIG. 11 shows the flow diagram, wherein the selector is moved to the task element 226. The user navigating through the flow diagram 220 might not want to go through a branch when he/she wishes to go from task element 226 to task element 230. The result of the usage of a fifth navigation command provided by the set of navigation commands is shown in FIG. 12, wherein the selector has been moved to task element 230. In order to move back to task element 226, the set of navigation commands further provides a sixth navigation command which can be regarded as the reverse command with respect to the fifth navigation command and which enables the user to move the selector from task element 230 to task element 226 without going through one of the branches of the flow diagram 220.

As mentioned with reference to FIG. 2, the path of a user through the flow diagram 220 is monitored and recorded in a navigation history 224 that is stored on the storage 208. The navigation history 224 is furthermore updated after a move of the selector. The set of navigation commands further provides a seventh navigation command that allows the user to go back, step by step in the navigation history. Thus, the selector can be moved step by step to the flow elements that have been visited before according to the user's navigation history. Moreover, the set of navigation commands provides an eighth navigation command that can be regarded as the reverse command with respect to the seventh navigation command.

Figure 13:
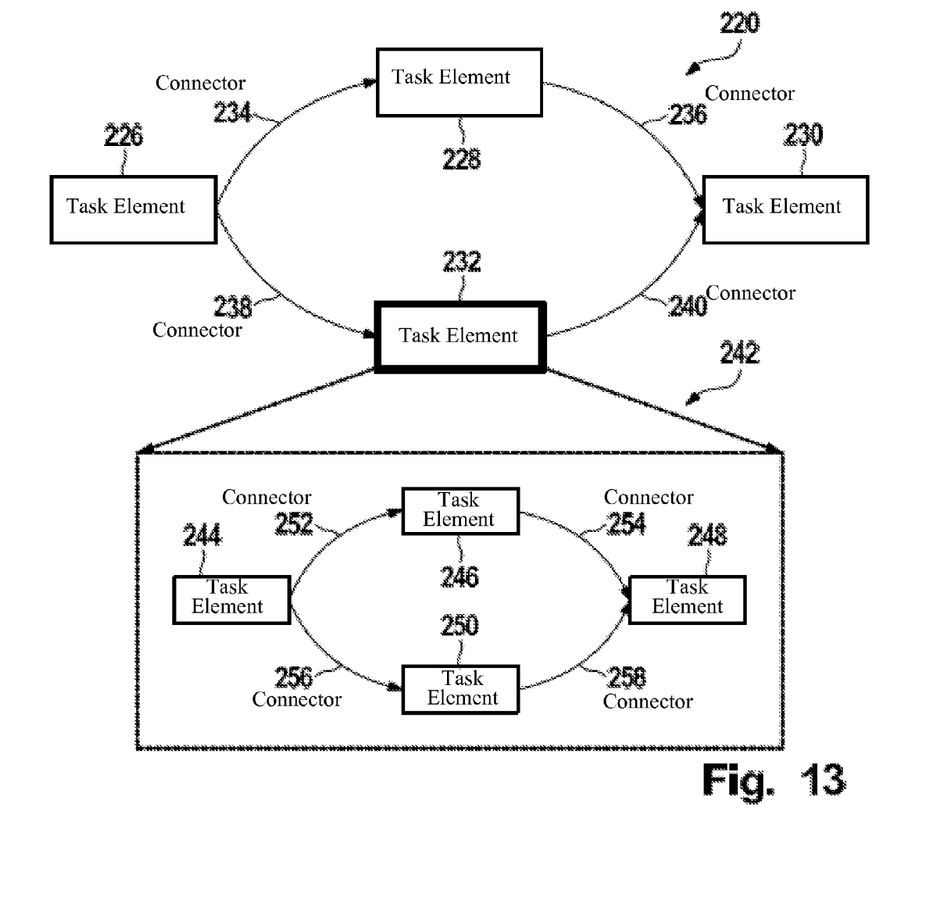
FIG. 13 shows schematically a flow diagram.

FIG. 13 shows the flow diagram 220, wherein the selector has been moved to task element 232. The task element 232 comprises according to the example illustrated with reference to FIG. 13 a sub-flow diagram 242 which can be accessed by use of a ninth navigation command that is provided by the set of navigation commands. When the data processing system that visualizes the flow diagram 220 receives the ninth navigation command, the sub-flow diagram 242 is made visible on the graphical user interface 218. According to the example shown here, the sub-flow diagram 242 comprises task elements 244, 246, 248, and 250 that are interconnected as shown in FIG. 13 by connectors 252, 254, 256, and 258. The navigation within the sub-flow diagram is possible for the user by use of the same navigation commands that can be used to navigate in the flow diagram 220 that is, the user is enabled to navigate in the sub-flow diagram 242 by the first navigation command, the second navigation command, the third navigation command, the fourth navigation command, the fifth navigation command, the sixth navigation command, and the seventh navigation command. In order to exit the sub-flow diagram and in order to move the selector back to task element 232, the set of navigation commands provides a tenth navigation command. In response to the reception of the tenth navigation command, the sub-flow diagram 242 might, e.g., disappear from the graphical user interface 218.

Figure 14:
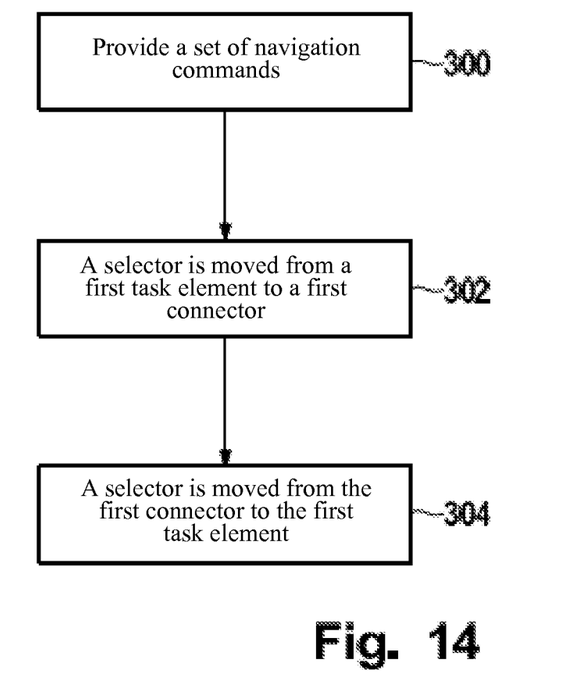
FIG. 14 shows a flow diagram illustrating steps performed by a method in accordance with the invention.

FIG. 14 shows a flow diagram illustrating steps performed by a method of navigating in a flow diagram in accordance with the invention. The flow diagram is displayed in a graphical user interface and comprises a set of task elements and a set of connectors. According to step 300 of the method in accordance with the invention, a set of navigation commands is provided. The set of navigation commands comprises a first navigation command and a second navigation command. According to step 302 of the method in accordance with the invention, a selector is moved from a first task element of the set of task elements to a first connector of the set of connectors in response to the reception of the first navigation command. The first connector immediately succeeds the first task element in the flow diagram. According to step 304 of the method in accordance with the invention, the selector is moved from the first connector to the first task element in response to the reception of the second navigation command.

What is claimed is:

1. A method of navigating in a flow diagram, the flow diagram being displayed in a graphical user interface (GUI) of a computing device, the flow diagram comprising a plurality of task elements and a plurality of connectors, the method comprising:
    providing a plurality of navigation commands, the navigation commands comprising a first navigation command and a second navigation command, wherein the navigation commands enable a user to move through the flow diagram;
    identifying a selector placed on a first task element, wherein the first task element is linked to a second task element by a first connector, wherein the first task element is linked to a third task element through a second connector, wherein the first task element, the second task element, and the third task elements have associated presentable data, wherein the presentable data is stored in a memory, wherein a first memory is a memory storing text for the first task element, wherein the stored text is presentable data that is presented in the graphical user interface at least when the selector is placed on the first task element;
    moving a selector from the first task element of a plurality of task elements to the first connector of a plurality of connectors in response to receiving the first navigation command; and
    receiving a to-connector navigation command;
    responsive to the to-connector navigation command moving the selector from the first connector to the second connector without having the computing device access the first memory since the selector does not move back to the first task element before moving to the second connector.

2. The method according to claim 1, comprising:
    moving the selector from the first connector to the second task element in response to the reception of the first navigation command when the selector is placed at the first connector.

3. The method according to claim 2, further comprising moving the selector from the second task element to the first connector in response to the reception of the second navigation command.

4. The method according to claim 2, wherein the set of navigation commands comprises a third navigation command and a fourth navigation command, wherein the to-connector navigation command is the third navigation command, wherein the method comprises:
    moving the selector from the first connector to the second connector in response to the reception of the third navigation command; and
    moving the selector from the second connector to the first connector in response to the reception of the fourth navigation command.

5. The method according to claim 4, wherein a third connector of the plurality of connectors links the second task element with a fourth task element of the plurality of task elements, wherein a fourth connector of the plurality of connectors links the third task element to the fourth task element, wherein the method comprises:
    moving the selector in the GUI from the fourth task element to the third connector in response to the reception of the second navigation command;
    moving the selector from the third connector to the fourth connector in response to the reception of the third navigation command; and
    moving the selector from the fourth connector to the third connector in response to the reception of the fourth navigation command.

6. The method according to claim 1, wherein the set of navigation commands comprises a fifth navigation command and a sixth navigation command, wherein the first task element is linked with a fifth task element of the plurality of task elements via a first branch of the flow diagram and via a second branch of the flow diagram, the first and second branches comprising each at least a task element of the plurality of task elements, wherein the method comprises:
    moving the selector in the GUI from the first task element to the fifth task element in response to receiving the fifth navigation command; and
    moving the selector in the GUI from the fifth task element to the first task element in response to the reception of the sixth navigation command.

7. The method according to claim 1, wherein the set of navigation commands comprises a seventh navigation command and an eighth navigation command, the method further comprising:

generating a navigation history by monitoring the navigation of a user through the flow diagram;
moving the selector from a first flow element to a second flow element in response to the reception of the seventh navigation command, wherein the first flow element is the actual flow element selected by the selector, and wherein the second flow element is the flow element selected before the first flow element according to the navigation history; and
moving the selector from the second flow element to the first flow element in response to the reception of the eight command, wherein the second flow element is the actual flow element selected by the selector, and wherein the first flow element is the flow element selected after the first flow element according to the navigation history, wherein the first flow element relates to a task element of the plurality of task elements or to a connector of the plurality of connectors, and wherein the second flow element relates to a task element of the plurality of task elements or to a connector of the plurality of connectors.

8. The method according to claim 7 further comprising storing the navigation history.

9. The method according to claim 1, wherein a task element of the plurality of task elements comprises a sub-flow diagram, wherein the set of navigation commands comprises a ninth and a tenth navigation command, wherein the ninth navigation command is employed to access the sub-flow diagram of the task element and wherein the tenth navigation command is employed to exit the sub-flow diagram.

10. The method according to claim 1, wherein at least one of the following commands is used to navigate in the sub-flow diagram: the first navigation command, the second navigation command, the third navigation command, the fourth navigation command, the fifth navigation command, the sixth navigation command, the seventh navigation command.

11. The method according to claim 1, wherein the set of navigation commands comprises an eleventh navigation command, wherein the eleventh navigation command is used to access the flow diagram, wherein in response to the reception of the eleventh navigation command, the selector is moved to the initial task element of the flow diagram.

12. The method of any claim 1, wherein a task element of the plurality of task elements is associated with a text, wherein the method comprises reading the text for a user of the GUI in response to a move of the selector to the task element.

13. A computer program product digitally encoded in a storage medium comprising computer executable instructions, the instructions being adapted when executed by a computer to cause the computer to:
provide a plurality of navigation commands, the navigation commands comprising a first navigation command and a second navigation command, wherein the navigation commands enable a user to move through the flow diagram;
identify a selector placed on a first task element, wherein the first task element is linked to a second task element by a first connector, wherein the first task element is linked to a third task element through a second connector, wherein the first task element, the second task element, and the third task elements have associated presentable data, wherein the presentable data is stored in a memory, wherein a first memory is a memory storing text for the first task element, wherein the stored text is presentable data that is presented in the graphical user interface at least when the selector is placed on the first task element;
move a selector from the first task element of a plurality of task elements to the first connector of a plurality of connectors in response to receiving the first navigation command; and
receive a to-connector navigation command;
responsive to the to-connector navigation command move the selector from the first connector to the second connector without having the computing device access the first memory since the selector does not move back to the first task element before moving to the second connector.

14. A data processing system for navigating in a flow diagram, the data processing system comprising:
computer executable instructions stored in at least one storage medium, the computer executable instructions being adapted when executed by a computer to cause the computer to display the flow diagram in a graphical user interface (GUI), the flow diagram comprising a plurality of task elements and a plurality of connectors;
computer executable instructions stored in at least one storage medium, the computer executable instructions being adapted when executed by a computer to cause the computer to provide a plurality of navigation commands, the navigation commands comprising a first navigation command and a second navigation command, wherein the navigation commands enable a user to move through the flow diagram;
computer executable instructions stored in at least one storage medium, the computer executable instructions being adapted when executed by a computer to cause the computer to identify a selector placed on a first task element, wherein the first task element is linked to a second task element by a first connector, wherein the first task element is linked to a third task element through a second connector, wherein the first task element, the second task element, and the third task elements have associated presentable data, wherein the presentable data is stored in a memory, wherein a first memory is a memory storing text for the first task element, wherein the stored text is presentable data that is presented in the graphical user interface at least when the selector is placed on the first task element;
computer executable instructions stored in at least one storage medium, the computer executable instructions being adapted when executed by a computer to cause the computer to move a selector from the first task element of a plurality of task elements to the first connector of a plurality of connectors in response to receiving the first navigation command; and
computer executable instructions stored in at least one storage medium, the computer executable instructions being adapted when executed by a computer to cause the computer to receive a to-connector navigation command; and
computer executable instructions stored in at least one storage medium, the computer executable instructions being adapted when executed by a computer to cause the computer to, responsive to the to-connector navigation command, move the selector from the first connector to the second connector without having the computing device access the first memory since the selector does not move back to the first task element before moving to the second connector.

15. The data processing system according to claim 14, wherein a third connector links the second task element with a fourth task element of the plurality of task elements, wherein a fourth connector links the third task element with the fourth task element, wherein the data processing system comprises:

computer executable instructions stored in at least one storage medium, the computer executable instructions being adapted when executed by a computer to cause the computer to move in the GUI the selector from the first connector to the second task element upon reception of the first navigation command;

computer executable instructions stored in at least one storage medium, the computer executable instructions being adapted when executed by a computer to cause the computer to move in the GUI the selector from the second task element to the first connector in reception to the second navigation command;

computer executable instructions stored in at least one storage medium, the computer executable instructions being adapted when executed by a computer to cause the computer to move in the GUI the selector from the first connector to the second connector in reception of a third navigation command, which is said to-connector navigation command;

computer executable instructions stored in at least one storage medium, the computer executable instructions being adapted when executed by a computer to cause the computer to move in the GUI the selector from the second connector to the first connector in reception of a fourth navigation command, wherein the third and fourth navigation commands are comprised in the set of navigation commands;

computer executable instructions stored in at least one storage medium, the computer executable instructions being adapted when executed by a computer to cause the computer to move the selector in the GUI from the fourth task element to the third connector of the plurality of connectors in response to the reception of the second navigation command; and computer executable instructions stored in at least one storage medium, the computer executable instructions being adapted when executed by a computer to cause the computer to move the selector between the third and fourth connector in response to the reception of the third or fourth navigation commands.

16. The data processing system according to claim 14, wherein the set of navigation commands comprises a fifth navigation command and a sixth navigation command, wherein the first task element is linked with a fifth task element via a first branch of the flow diagram and via a second branch of the flow diagram, the first and second branches comprising each at least a task element of the plurality of task elements, wherein the data processing system comprises:

computer executable instructions stored in at least one storage medium, the computer executable instructions being adapted when executed by a computer to cause the computer to move the selector in the GUI from the first task element to the fifth task element in response to the reception of the fifth navigation command; and computer executable instructions stored in at least one storage medium, the computer executable instructions being adapted when executed by a computer to cause the computer to move the selector in the GUI from the fifth task element to the first task element in response to the reception of the sixth navigation command.

17. The data processing system according to claim 16, wherein the set of navigation commands provides a seventh navigation command and an eighth navigation command, the data processing system comprising:

computer executable instructions stored in at least one storage medium, the computer executable instructions being adapted when executed by a computer to cause the computer to generate a navigation history by monitoring the navigation of a user through the flow diagram;

computer executable instructions stored in at least one storage medium, the computer executable instructions being adapted when executed by a computer to cause the computer to move the selector from a first flow element to a second flow element in response to the reception of the seventh command, wherein the first flow element is the actual flow element selected by the selector, and wherein the second flow element is the flow element selected before the first flow element according to the navigation history; and computer executable instructions stored in at least one storage medium, the computer executable instructions being adapted when executed by a computer to cause the computer to move the selector from the second flow element to the first flow element in response to the reception of the eight command, wherein the second flow element is the actual flow element selected by the selector, and wherein the first flow element is the flow element selected after the first flow element according to the navigation history, wherein the first flow element relate to a task element of the plurality of task elements or to a connector of the plurality of connectors, and wherein the second flow element relates to a task element of the plurality of task elements or to a connector of the plurality of connectors.

18. The data processing system of claim 14, wherein a task element of the plurality of task elements comprises a sub-flow diagram, wherein the data processing system comprises:

computer executable instructions stored in at least one storage medium, the computer executable instructions being adapted when executed by a computer to cause the computer to access the sub-flow diagram of the task element in response to the reception of a ninth navigation command;

computer executable instructions stored in at least one storage medium, the computer executable instructions being adapted when executed by a computer to cause the computer to exit the sub-flow diagram of the task element in response to the reception of a tenth navigation command, wherein the ninth and tenth navigation commands are comprised in the set of navigation commands.

19. The data processing system according to claim 14, further comprising a screen reader, wherein a task element of the plurality of task elements is associated with a text, wherein the screen reader is employed for reading the text for a user of the GUI in response to a move of the selector to the task element.

* * * * *